United States Patent [19]

Wells

[11] Patent Number: 5,191,225

[45] Date of Patent: Mar. 2, 1993

[54] WAVE POWER APPARATUS

[75] Inventor: Alan A. Wells, Ely, United Kingdom

[73] Assignee: Secretary of State for Energy in Her Britannic Majesty's Government of the United Kingdom of Great Britain and Northern Ireland, London, England

[21] Appl. No.: 784,465

[22] Filed: Oct. 18, 1991

[30] Foreign Application Priority Data

Oct. 18, 1990 [GB] United Kingdom ............... 9022713

[51] Int. Cl.⁵ ............................................. F03B 13/12
[52] U.S. Cl. ....................................... 290/53; 290/42; 417/100
[58] Field of Search ................... 60/398, 412; 290/42, 290/53; 417/100

[56] References Cited

U.S. PATENT DOCUMENTS

| 4,221,538 | 9/1980 | Wells ................................ 290/53 |
| 4,405,866 | 9/1983 | Masuda et al. ..................... 290/53 |

FOREIGN PATENT DOCUMENTS

| 0000441 | 1/1979 | European Pat. Off. |
| 171104 | 2/1923 | United Kingdom ............... 417/100 |
| 1386335 | 3/1975 | United Kingdom. |
| 1482933 | 8/1977 | United Kingdom. |
| 2036193 | 6/1980 | United Kingdom. |
| 2045362 | 10/1980 | United Kingdom. |
| 1581305 | 12/1980 | United Kingdom. |
| 1595700 | 8/1981 | United Kingdom. |
| 1601060 | 10/1981 | United Kingdom. |
| 1601219 | 10/1981 | United Kingdom. |
| 2088485 | 6/1982 | United Kingdom. |

Primary Examiner—A. D. Pellinen
Assistant Examiner—Robert Lloyd Hoover
Attorney, Agent, or Firm—William R. Hinds

[57] ABSTRACT

A wave power apparatus (10) includes a chamber (16) which may be constructed over a coastal gully (12) so that waves (14) cause the water level to rise and fall in the chamber, and so cause air to flow to and fro in a duct (32). A Wells-type biplane turbine (34) in the duct (32) drives a generator (36). The turbine (34) comprises two turbine discs (45) 0.5 m apart, each defining a hub, a plurality of aerofoil section straight blades (80), and an outer ring (56). The ring (56) is sufficiently massive to act as an energy-storage flywheel, and has a greater moment of inertia than the hub and the blades. Each turbine disc (45) might have a kinetic energy of at least 1 MJ when rotating at 1650 rpm.

10 Claims, 3 Drawing Sheets

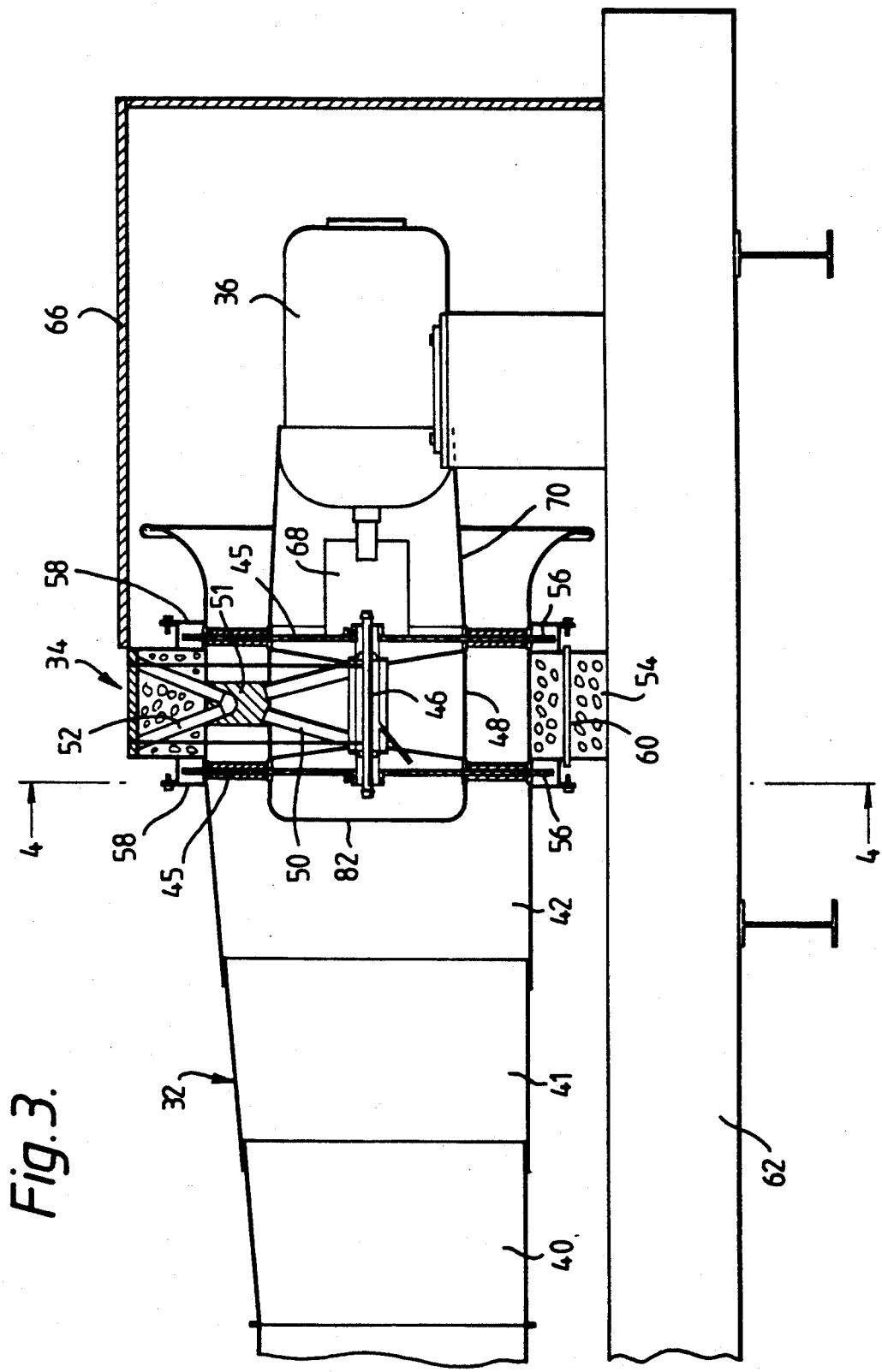

WAVE POWER APPARATUS

This invention relates to apparatus whereby power may be extracted from waves, for example in the sea, and may be used to generate electricity.

Renewable energy resources such as solar power, wind power and wave power are seen as beneficial in reducing the risks of atmospheric pollution and change to the earth's climate which may arise from the extensive use of fossil fuels, and also in reducing dependence on fuel resources which may become expensive or scarcer in future. Ocean waves are one of the most abundant sources of renewable energy, and provide a much larger energy density than either wind or solar power. However it has not been found easy to harness wave power; this is partly because any device suitable for extracting wave power from the open sea must be sufficiently strong to withstand storms in which the wave power is much greater than the average power, and so is expensive to construct: for example off the coast of the Outer Hebrides at a depth of 42 m the mean annual wave power is 50 kW/m but the power can exceed 1000 kW/m in storms. Waves are caused primarily by the interaction of winds with the sea surface, and once formed will continue to travel after the wind has died down. In deep water long smooth swells can persist for hundreds of kilometres, whereas shorter steeper waves rapidly die out. Nearer the coast the sea is generally shallower and in the Hebrides at a depth of 10 m the average power would be about 10 kW/m, although this can be significantly affected by the topography of the sea bed and of the coast, and in a narrow tapering gully the average power may be over 20 kW/m.

According to the present invention there is provided apparatus for extracting power from waves on the sea, comprising means defining a chamber communicating at its lower part with the sea so that waves on the sea cause the water level within the chamber to go up and down, a duct communicating with an upper part of the chamber so that the said movement of the water level causes air to flow to and fro through the duct, and turbine means arranged to be exposed to the said flow of air, the turbine means comprising two turbines on the same shaft, the airflow passing through the two turbines in series, each turbine comprising a hub portion, a plurality of straight, aerofoil-section blades extending in a substantially radial plane from the hub portion, and a circumferential ring fixed to the outer ends of the blades concentric with the hub portion, the ring being sufficiently massive to act as a flywheel and having a greater moment of inertia than that of the hub portion and the blades.

Preferably each ring is sufficiently massive that each turbine stores at least 1 MJ of kinetic energy at a rotation speed of 1650 rpm (which requires a moment of inertia of at least 67 kg m$^2$). Such a flywheel provides sufficient inertia to smooth the irregular supply of energy obtained from waves, with less than 5% variation in the power which may be taken from the turbine means. Since the ring is connected directly to the turbine blades problems of torque transmission between a flywheel and the turbine are substantially eliminated. Preferably the ring is integral with the blades.

The apparatus desirably also incorporates an electric generator driven by the turbine means. Each turbine is of the Wells type (as described for example in UK patent GB 1 595 700) and is therefore driven to rotate the same direction irrespective of the direction of the air flow. Preferably each turbine has four equally spaced blades, and preferably the blades of one turbine are staggered relative to those of the other turbine. The peak efficiency of such a two-turbine turbine means (a biplane) can be significantly greater than that of a monoplane turbine which provides the same degree of damping to motion of the water level. Furthermore a Wells type biplane is less likely to stall, in operation, than a monoplane, as it provides efficient energy absorption (between about 60 and 70%) over a wider range of air flow rates. Stalling of a Wells turbine occurs if there is a sudden increase in the air flow rate (due to a larger wave) without a corresponding increase in the rate of rotation, as the angle of attack of the air flow to the blades increases to beyond the stalling angle. With a biplane the first set of blades will still stall but the second turbine continues to provide energy absorption because the air flow is modified by the first turbine. A still greater range of air flow rates over which the biplane provides efficient energy absorption can be obtained with non-radial blades, in particular if each blade has its centre-line parallel to a radial line but displaced therefrom in the direction towards the trailing edge by about a third of the chord of the blade.

The preferred method of making each turbine is to cut out four apertures from a circular steel plate of the diameter of the turbine and of thickness for example 25 mm so as to define a hub, a concentric ring, and four spokes and then to fix shaped components to each spoke so as to form the requisite aerofoil shaped blades.

In the preferred embodiment the apparatus is located at the sea shore, with the chamber constructed so as to communicate with the sea in a gully, the gully being such as to focus wave power into the chamber. The gully might be an artificial channel, or might be a natural gully, and is desirably located on a coastline exposed to substantial wave power throughout the year. Since the amplitude of waves tends to increase with fetch, in the British Isles the greatest wave power is found on west-facing coasts exposed to the Atlantic, for example in Cornwall, or in the Hebrides and the West coast of Scotland. In these places, even when there is no wind locally, there is usually at least some swell. Desirably the location of the channel in relation to the topography of the local sea bed and coastline is chosen to maximise the available wave power. The chamber should be constructed at such a position that it communicates with the sea at all states of the tide. Since almost all the construction and subsequent maintenance is carried out on land, the apparatus is significantly cheaper than wave power devices for use in the open sea.

Preferably the turbine means includes a hub cover presenting a substantially flat face towards the air flow. Desirably the duct encloses the turbine means and defines circumferential channels within which the circumferential rings rotate. Preferably labyrinth seals are provided between each turbine and adjacent stationary components at the outer diameter of the hub portion and at the inner diameter of the circumferential ring. In the preferred embodiment a stationary fairing of the diameter of the hub portions is located between the two hub portions, and a further stationary fairing encloses the means connecting the turbine means to the generator, provided with labyrinth seals as described above, and the hub portions are both perforated so as to minimise axial loads due to air pressure on the hub portions.

The invention will now be further described, by way of example only, and with reference to the accompanying drawings in which:

FIG. 3 shows a part of the sectional view of FIG. 2 to a larger scale;

Figure 1:
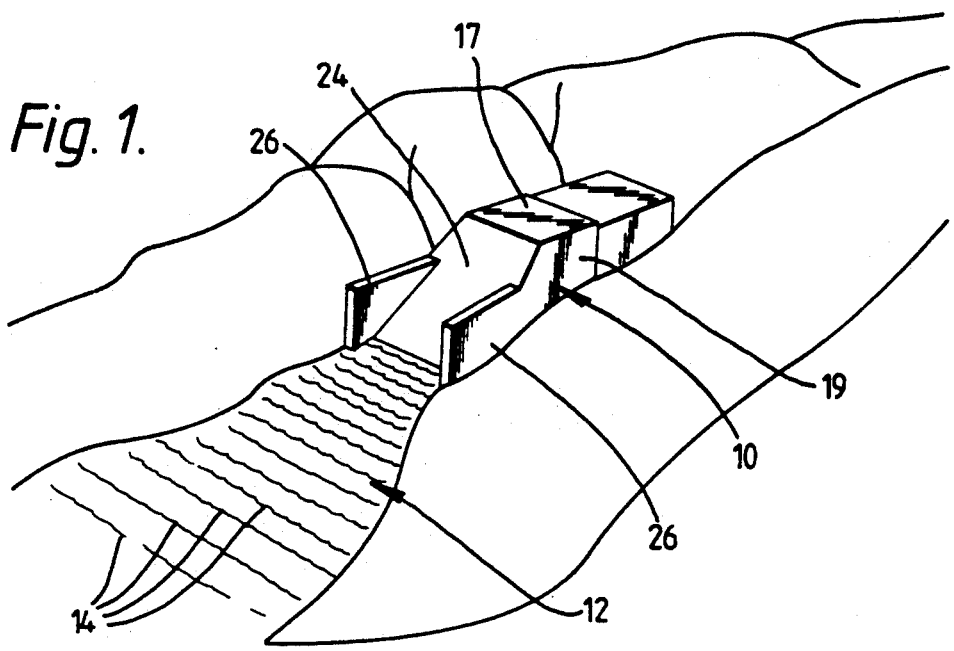
FIG. 1 shows a diagrammatic perspective view of wave power apparatus.
Figure 2:
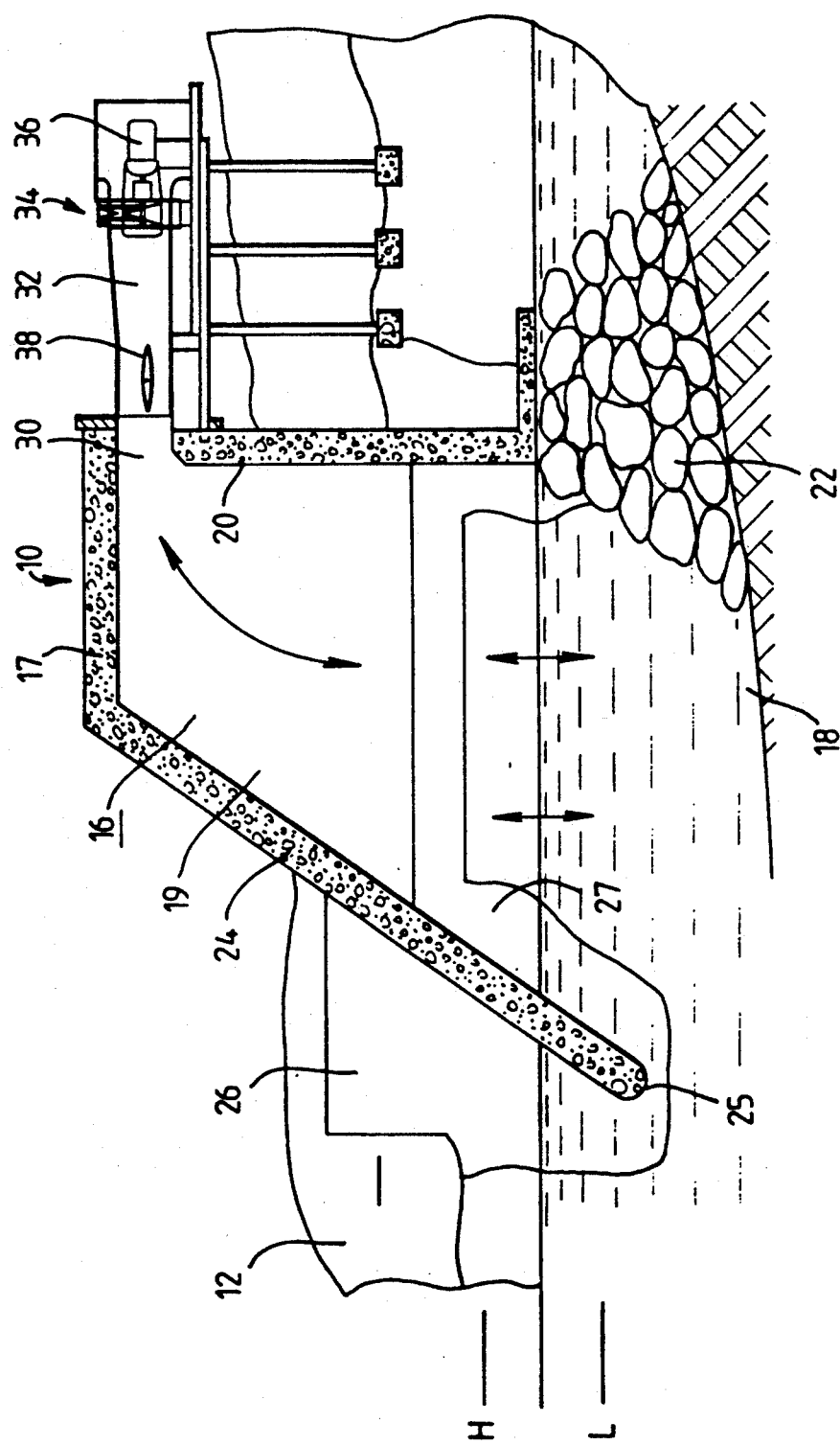
FIG. 2 shows a sectional view of the apparatus of FIG. 1.

Referring to FIG. 1, a wave power apparatus 10 is constructed in a rock-sided gully 12 in a coastline so waves 14 impact on it. Referring to FIG. 2 the apparatus 10 includes a chamber 16 of rectangular cross-section in a horizontal plane, about 5 m wide (the width of the gully 12), with a flat concrete roof slab 17 about 12 m above the sea bed 18, upright concrete side walls 19 extending upward from the rock sides of the gully 12, an upright concrete rear wall 20 below which piles (not shown) are driven into the sea bed 18 and covered by rock fill 22, and a sloping concrete front wall 24 whose front edge 25 is 12 m in front of the rear wall 20, and whose top is about 5.5 m in front of the rear wall 20. Concrete wing walls 26 extend forward of the front wall 24 at each side of the gully 12. The slab 17 and the walls 19, 20, 24 and 26 are constructed of precast hollow concrete beams into which (after assembly) concrete is cast in situ, so ensuring the chamber 16 is airtight. The lowermost precast beams of the front and rear walls locate at each end in slots in opposite walls of the gully 12, the slots being defined in concrete edge beams 27 cast in situ, with the use of shuttering, along each side of the gully 12; this edge beam 27 also provides a foundation for the side walls 19.

The mean high water level (springs) is indicated by H and the mean low water level (springs) is indicated by L. The front edge 25 of the front wall 24 is sufficiently low to be beneath the water level at all states of the tide. Waves 14 in the gully 12 consequently cause the water level in the chamber 16 to go up and down. Just below the roof slab 17 is a port 30 in the rear wall 20 which communicates with an air duct 32. The movements of the water level in the chamber 16 cause air to flow to and fro in the duct 32, and this air flow is used to drive a Wells biplane turbine 34 connected to a 75 kW electric generator 36. At the mouth of the duct 32 is a butterfly valve 38 whereby air flow to the turbine may be cut off; in this case air can flow in and out of the chamber 16 through a poppet valve (not shown), both the butterfly valve 38 and the poppet valve being actuated by respective pneumatic air-bags (not shown).

Referring now to FIG. 3, the duct 32 leading to the biplane turbine 34 includes three tube portions 40, 41, 42 each tapering towards the chamber 16, which can be telescoped into each other to allow access to the biplane turbine 34. Beyond the biplane turbine 34 the duct 32 is open, with a flared end. The biplane turbine 34 comprises two circular turbine discs 45, described in more detail below, 0.5 m apart and each of diameter 1.5 m supported by a hub and bearing assembly 46 (Timken type LM 603049/LM 603011) with axially preloaded pairs of taper roller bearings and a floating splined interconnecting shaft (whereby the relative angle between the two discs 45 can be adjusted). The bearing assembly 46 is enclosed within a cylindrical fairing 48 and both are supported coaxial with the duct 32 by a three-arm spider 50 (only one arm being shown). Each arm of the spider 50 includes a faired rectangular block 51 spanning the gap between the fairing 48 and the duct 32, held by an X-array of tubes 52; the outer end of each arm extends through the wall of the duct 32 and is embedded in concrete which fills a square casing 54 around that part of the duct 32. An outer rim 56 of each turbine disc 45 protrudes outside the duct 32 and is enclosed in a respective annular casing 58 attached to the casing 54 by means of cross tubes 60 embedded in the concrete.

The duct 32 is supported by a chassis girder 62, as is the concrete casing 54, and also the electric generator 36 which is aligned with the biplane turbine 34 but outside the duct 32, and a safety screen 66 which encloses the generator 36 and the open end of the duct 32. The generator 36 is connected to the shaft of the biplane turbine 34 by a coupling 68, and a fairing 70 of substantially the same diameter as the fairing 48 is fixed to the generator 36 to enclose the coupling 68.

Figure 4:
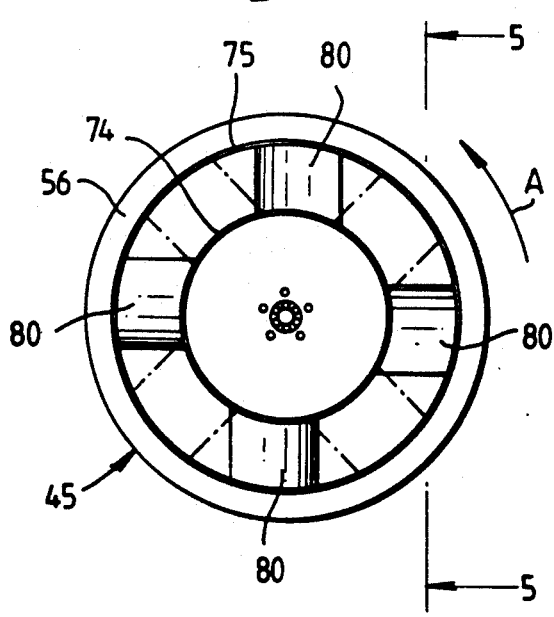
FIG. 4 shows a sectional view on the line 4—4 of FIG. 3.
Figure 5:
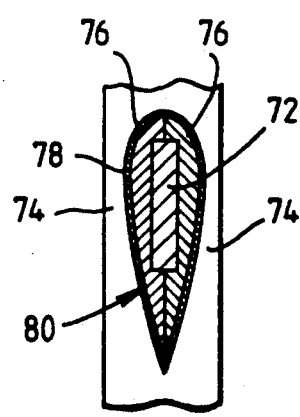
FIG. 5 shows a sectional view on the line 5—5 of FIG. 4, to a larger scale.

Each turbine disc 45 comprises a steel plate of diameter 1.5 m and initially of thickness 30 mm. Referring to FIGS. 4 and 5, four apertures are cut from each plate to leave four equally spaced spokes 72, the apertures being bounded by concentric arcs of diameter 0.79 and 1.29 m, and each plate is machined down to a thickness of 25 mm, leaving protruding rings 74, 75 which form shoulders at each end of each spoke 72. Each spoke 72 is then enclosed between moulded cover pieces 76 of composite material which are encased in a thin sheet 78 of polished stainless steel, welded along the trailing edge and dressed to ensure a sharp clean edge, so it forms a blade 80 of symmetrical aerofoil cross-section. The spokes 72 are in positions such that the centre lines of the blades 80 are parallel to radial lines but displaced towards the trailing edge by a third of the chord of the blade. As shown in FIG. 4 the blades 80 on the two discs 45 are staggered by 45° relative to each other. As shown in FIG. 3 a flat hub cover 82 of diameter 0.78 m is attached to the left hand face of the left hand turbine disc 45.

Thus in operation the air flows to and fro along the annular passage between the hub cover 82, the fairing 48 and the fairing 70, and the surrounding wall of the duct 32. The blades 80 of the two turbine discs 45 are thus exposed to the air flow, and are caused to rotate in the direction of the arrow A of FIG. 4. Although the air flow fluctuates in magnitude and direction the turbine discs 45 always experience a torque in the sense of the arrow A, and because of their rotational inertia tend to rotate at a substantially steady speed, typically about 1650 rpm.

To minimize the axial loads on the bearing assembly 46, the hub cover 82 and the hubs of the turbine discs 45 are perforated, and labyrinth seals (not shown) of mylar honeycomb material are provided at both ends of the fairing 48 and at the end of the fairing 70 next to the turbine disc 45. Similar seals for provided in the annular casings 58 on each side of the outer rims 56 of the turbine discs 45. Consequently the pressure inside the fairings 48 and 70 is always substantially equal to the pressure outside the hub cover 82, yet very little air flow occurs through the perforations. The use of the squat flat hub cover 82 rather than a nose cone on the end of the biplane turbine 34 minimises the frictional losses, because of its small area (the air flow in the duct 32 incident on the biplane turbine 34 is typically only about 15 m/s).

Each of the turbine discs 45 described above has a moment of inertia of about 70 kg m$^2$, of which the greatest part (about 44 kg m$^2$) is contributed by the outer rim 56. Consequently at the typical rotation speed each has a kinetic energy greater than a million joules, which is sufficient to ensure substantially steady rotation of the biplane turbine 34 and of the generator 36 in spite of the inevitable variations in the flow of air through the duct 32. It is desirable to prevent the passage of water droplets through the biplane turbine 34. The height of the chamber 16 should be sufficient to provide at least 1 m clearance between the port 30 and the water level in extreme conditions: a high spring tide, a maximum storm surge, low damping of the water column oscillation, and sloshing of the surface. Nevertheless it may be advisable to provide moisture separators (not shown), as known for example for use in air intakes on off-shore oil rigs, in the duct 32.

It will be appreciated that a wave power apparatus may differ from that described above while remaining within the scope of the invention. For example a single chamber 16 might be provided with more than one port 30, each port 30 providing air flow to a different biplane turbine 34 driving a respective generator 36. Yet again a rock gully 12 might be spanned by a plurality of side-by-side chambers 16 substantially as described above, each supplying air flow to a separate biplane turbine 34 as described above.

I claim:

1. An apparatus for extracting power from waves on the sea, comprising means defining a chamber communicating at its lower part with the sea so that waves on the sea cause the water level within the chamber to go up and down, a duct communicating with an upper part of the chamber so that the said movement of the water level causes air to flow to and fro through the duct, and turbine means arranged to be exposed to the said flow of air, the turbine means comprising two turbines on the same shaft, the said air flow passing through the two turbines in series, each turbine comprising a hub portion, a plurality of straight, aerofoil-section blades extending in a substantially radial lane from the hub portion, and a circumferential ring fixed to the outer ends of the blades concentric with the hub portion, the ring being sufficiently massive to act as a flywheel and having a greater moment of inertia than that of the hub portion and the blades.

2. An apparatus as claimed in claim 1 wherein each ring is sufficiently massive that each turbine has a moment of inertia of at least 67 kg m$^2$.

3. An apparatus as claimed in claim 1 wherein each ring is integral with the blades of the respective turbine.

4. An apparatus as claimed in claim 3 wherein each turbine comprises a single circular plate defining the hub portion, spokes, and the ring, and shaped components fixed to each spoke to form the aerofoil-section blades.

5. An apparatus as claimed in claim 1 wherein the blades of each turbine are equally spaced, and the blades of one turbine are staggered relative to those of the other turbine.

6. An apparatus as claimed in claim 5 wherein the centre-line of each blade is parallel to a radial line but displaced therefrom in the direction towards the trailing edge of the blade by a third of the chord of the blade.

7. An apparatus as claimed in claim 1 wherein the turbine means also includes a hub cover presenting a substantially flat face towards the air flow.

8. An apparatus as claimed in claim 1 wherein the duct encloses the turbine means and defines circumferential channels within which the circumferential rings rotate.

9. An apparatus as claimed in claim 8 wherein labyrinth seals are provided between each turbine and adjacent stationary components at the outer diameter of the hub portion and at the inner diameter of the circumferential ring.

10. An apparatus as claimed in claim 1 wherein a stationary fairing of the diameter of the hub portions is located between the two hub portions, and a further stationary fairing encloses means connecting the turbine means to a generator, provided with labyrinth seals between each fairing and adjacent portions of the hub portions, and the hub portions are both perforated so as to minimise axial loads due to air pressure on the hub portions.

* * * * *